United States Patent
Abdoli et al.

(10) Patent No.: US 11,240,804 B2
(45) Date of Patent: Feb. 1, 2022

(54) FREQUENCY LOCATION INDEXING FOR A WIDEBAND COMPONENT CARRIER

(71) Applicant: Huawei Technologies Co., Ltd., Shenzhen (CN)

(72) Inventors: Javad Abdoli, Kanata (CA); Zhenfei Tang, Kanata (CA); Junchao Li, Shanghai (CN); Hao Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/705,643

(22) Filed: Dec. 6, 2019

(65) Prior Publication Data

US 2020/0120676 A1    Apr. 16, 2020

Related U.S. Application Data

(63) Continuation of application No. 15/915,360, filed on Mar. 8, 2018, now Pat. No. 10,517,093, which is a (Continued)

(51) Int. Cl.
| | |
|---|---|
| *H04W 72/04* | (2009.01) |
| *H04L 5/00* | (2006.01) |
| *H04W 48/12* | (2009.01) |
| *H04W 88/02* | (2009.01) |
| *H04W 88/08* | (2009.01) |

(52) U.S. Cl.
CPC ........... *H04W 72/0453* (2013.01); *H04L 5/00* (2013.01); *H04W 48/12* (2013.01); *H04L 5/0007* (2013.01); *H04W 88/02* (2013.01); *H04W 88/08* (2013.01)

(58) Field of Classification Search
CPC ........... H04W 72/042; H04W 72/0446; H04W 88/02; H04W 72/0453; H04W 72/1289; H04W 72/14; H04W 72/04; H04W 72/044; H04W 72/048; H04L 5/0048; (Continued)

(56) References Cited

U.S. PATENT DOCUMENTS

| | | | |
|---|---|---|---|
| 10,523,354 B2 * | 12/2019 | Si | ........................ H04J 11/0076 |
| 2013/0039331 A1 | 2/2013 | Koorapaty et al. | |

(Continued)

FOREIGN PATENT DOCUMENTS

| | | |
|---|---|---|
| CN | 101640922 A | 2/2010 |
| CN | 104144045 A | 11/2014 |

(Continued)

OTHER PUBLICATIONS

Huawei, et al., "Discussion on resource allocation and indication for data channel", 3GPP TSG RAN WG1 Meeting #88, R1-1701662, Feb. 13-17, 2017, 4 Pages, Athens, Greece.

(Continued)

*Primary Examiner* — Allahyar Kasraian
(74) *Attorney, Agent, or Firm* — Slater Matsil, LLP

(57) ABSTRACT

A method, system, and device for resource block (RB) indexing in a user equipment (UE) is provided. In an embodiment, the method includes obtaining, at the UE, a UE-independent frequency reference point. The method also includes determining, by the UE, a UE-independent index of an RB according to the UE-independent frequency reference point.

34 Claims, 8 Drawing Sheets

Related U.S. Application Data continuation of application No. PCT/CN2017/088376, filed on Jun. 15, 2017.

(58) Field of Classification Search
CPC ... H04L 5/0053; H04L 5/0023; H04L 5/0051; H04L 5/001; H04L 5/0007; H04L 5/0094
See application file for complete search history.

(56) References Cited

U.S. PATENT DOCUMENTS

| | | |
|---|---|---|
| 2016/0065338 A1 | 3/2016 | Kim et al. |
| 2017/0111886 A1* | 4/2017 | Kim ............... H04W 48/14 |
| 2018/0131493 A1 | 5/2018 | Luo et al. |
| 2018/0192383 A1 | 7/2018 | Nam et al. |
| 2018/0295590 A1 | 10/2018 | Abedini et al. |
| 2018/0359790 A1* | 12/2018 | Ingale ............. H04W 28/16 |
| 2019/0150190 A1* | 5/2019 | Kim ............... H04W 56/00 370/329 |
| 2019/0229867 A1* | 7/2019 | Yi ................. H04L 5/0048 |
| 2020/0052939 A1* | 2/2020 | Xiong ............. H04L 5/0026 |
| 2020/0068512 A1* | 2/2020 | Xue ............... H04W 72/005 |
| 2020/0187159 A1* | 6/2020 | Ko ................ H04J 11/0069 |
| 2020/0274750 A1* | 8/2020 | Yi ................. H04W 72/0453 |
| 2020/0404617 A1* | 12/2020 | Murray ............ H04W 52/0229 |

FOREIGN PATENT DOCUMENTS

| | | |
|---|---|---|
| CN | 104823422 A | 8/2015 |
| WO | 2016013744 A1 | 1/2016 |
| WO | 2016127403 A1 | 8/2016 |
| WO | 2017039372 A1 | 3/2017 |
| WO | 2017067436 A1 | 4/2017 |

OTHER PUBLICATIONS

Huawei, et al., "Coexistence of different UE types on a wideband carrier", 3GPP TSG RAN WG1 Meeting #90, R1-1713733, Aug. 21-25, 2017, 6 Pages, Prague, Czech Republic.

LG Electronics, "WF on PRB indexing for a UE in wider bandwidth operation", 3GPP TSG RAN1 #89, R1-170xxxx, Agenda Item: 7.1.7, May 15-19, 2017, 2 Pages, Hangzhou, China.

NTT Docomo, Inc., "Further views on wider bandwidth operations for NR", 3GPP TSG RAN WG1 Meeting #89, R1-1708494, May 15-19, 2017, 6 Pages Hangzhou, P.R. China.

Huawei et al., "Discussion on resource allocation and indication on NR [online]," 3GPP TSG RAN WG1 Meeting #87, Nov. 14-18, 2016, R1-1611661, 4 pages.

* cited by examiner

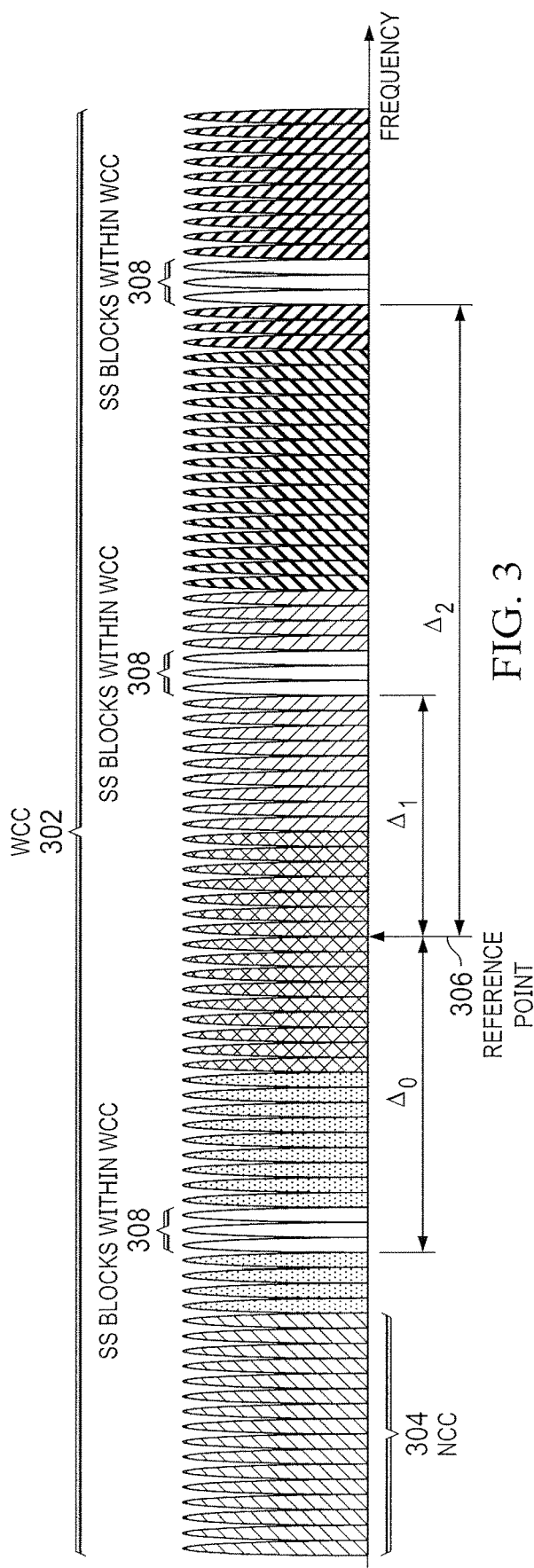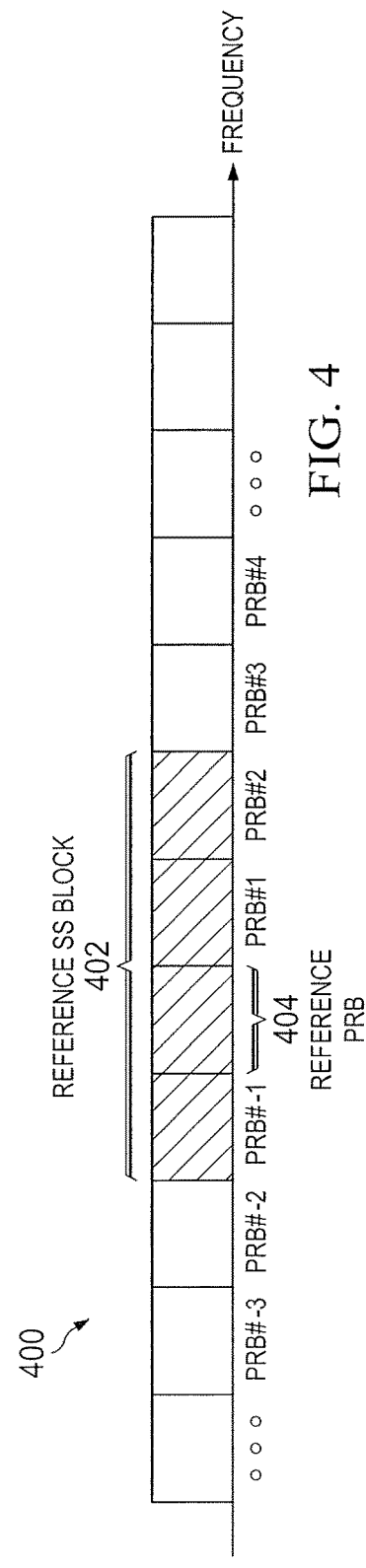

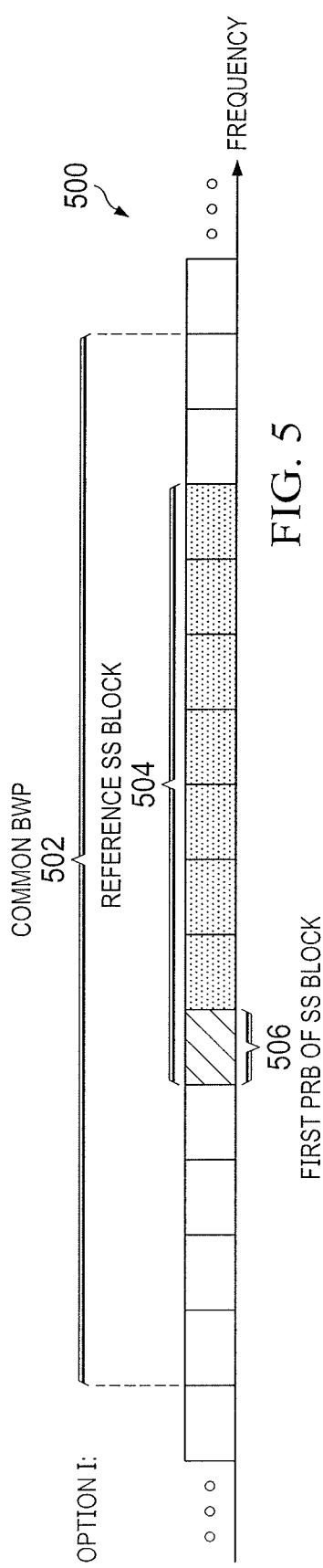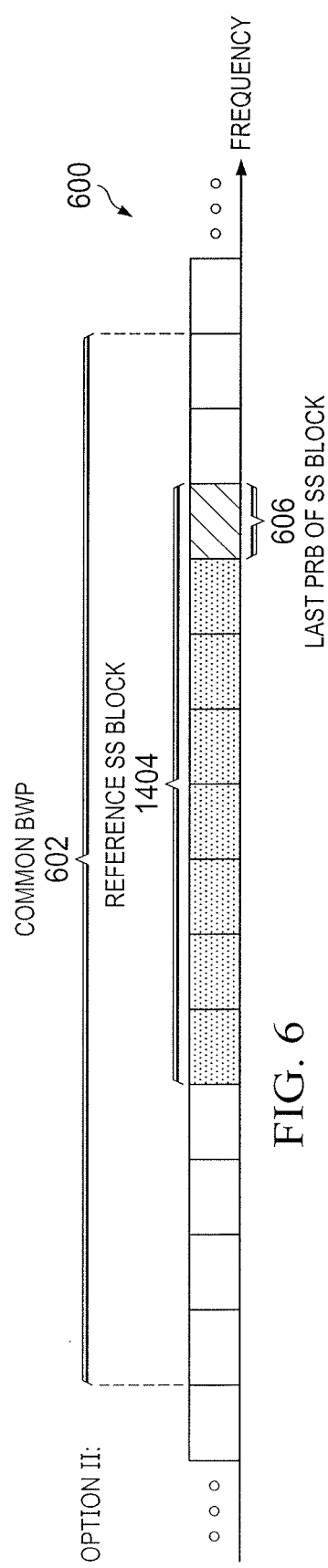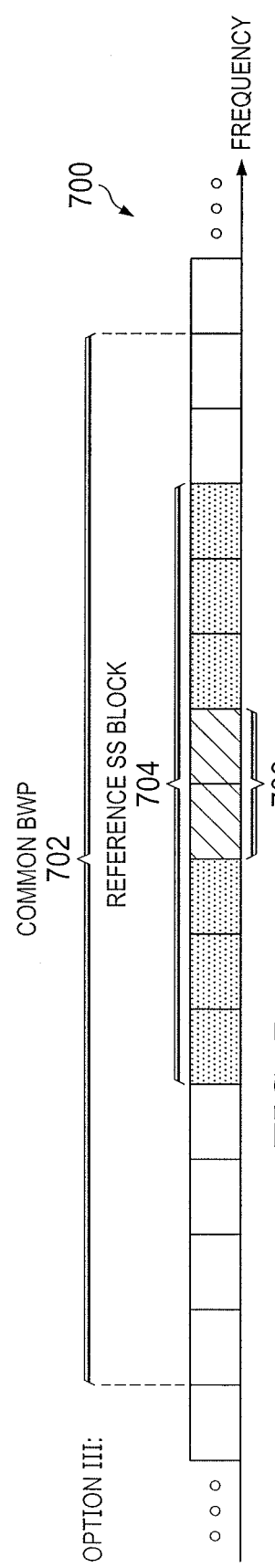

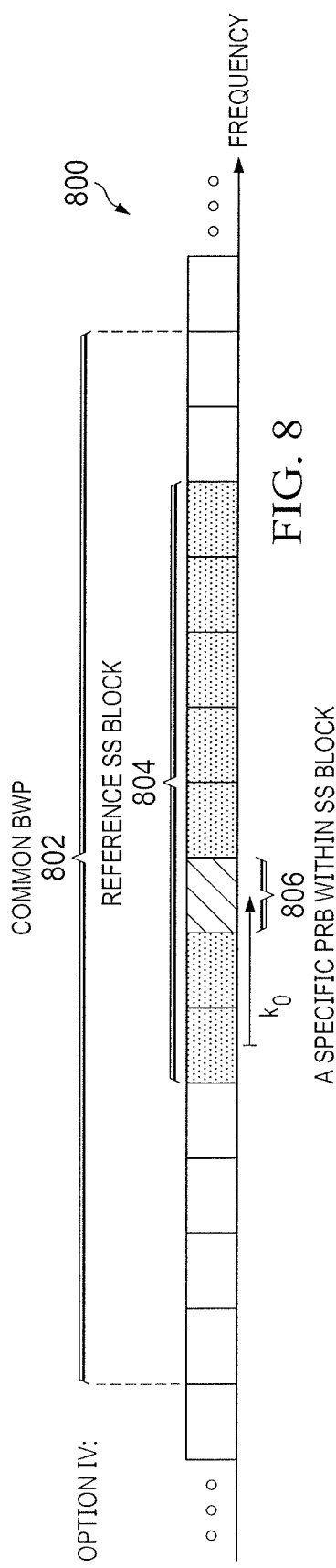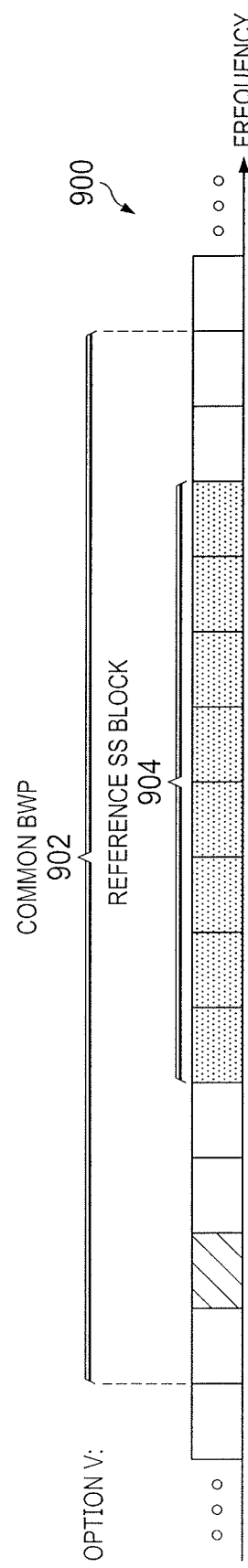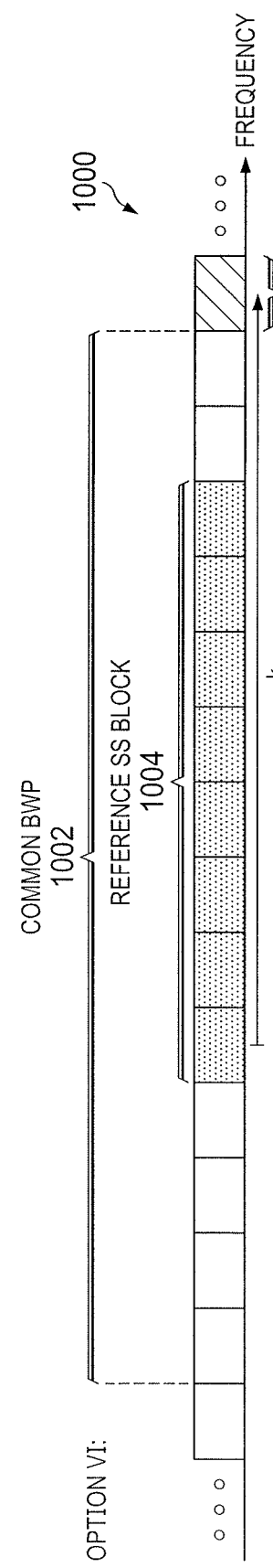

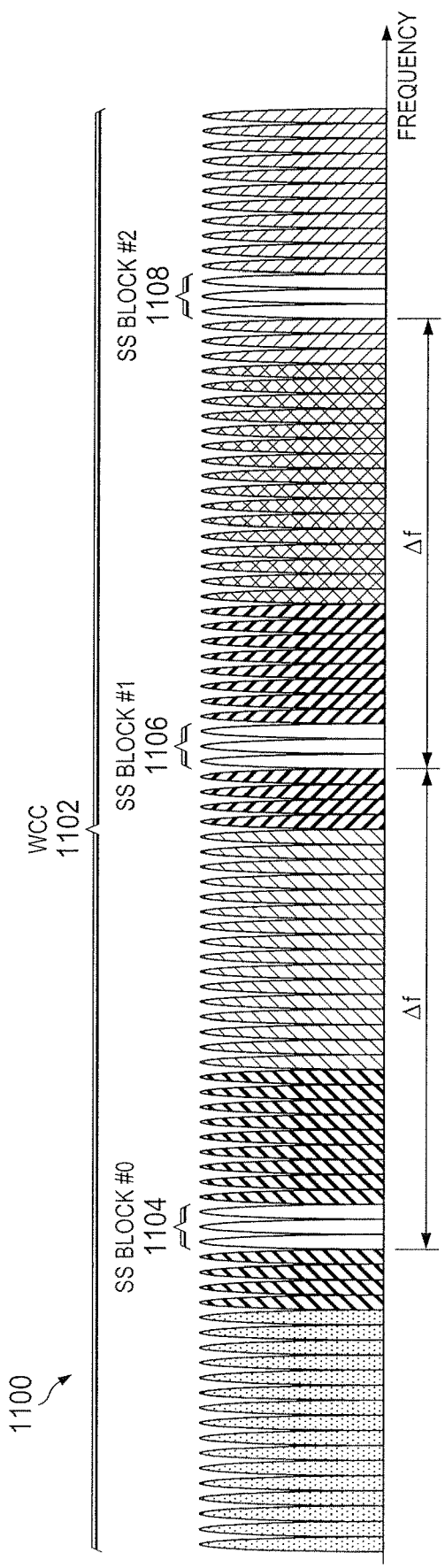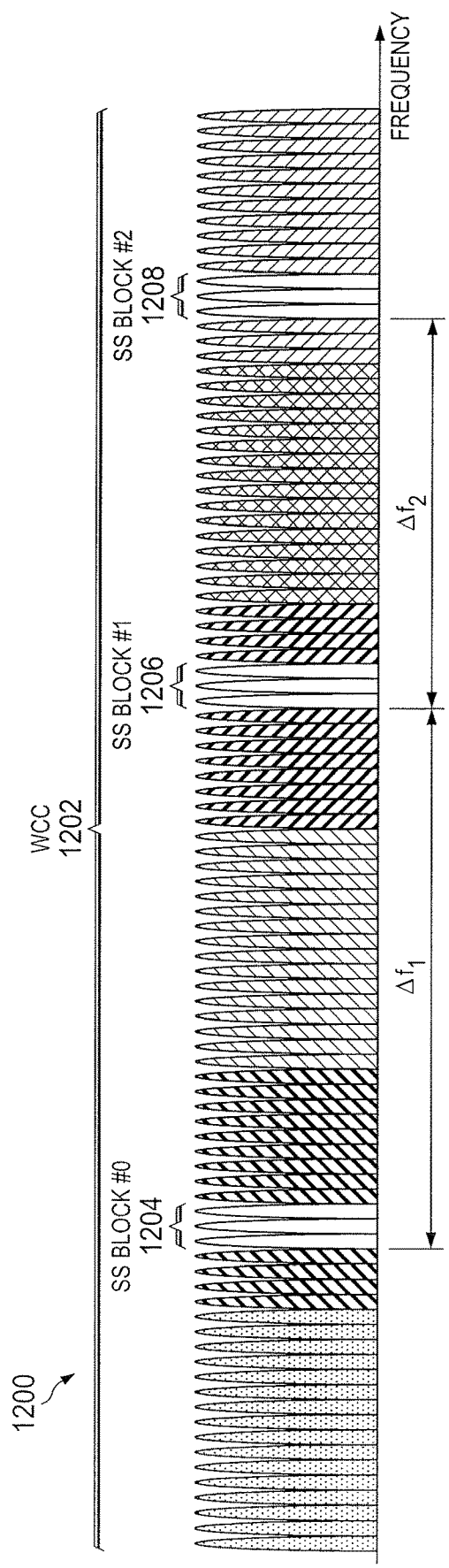

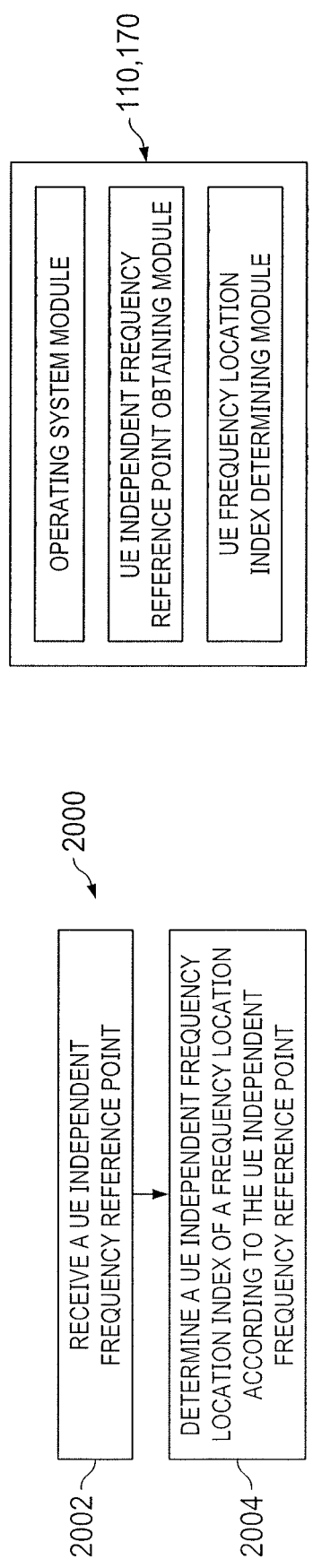

FREQUENCY LOCATION INDEXING FOR A WIDEBAND COMPONENT CARRIER

CROSS-REFERENCE TO RELATED APPLICATIONS

This application is a continuation of U.S. patent application Ser. No. 15/915,360, filed on Mar. 8, 2018, which is a continuation of International Application No. PCT/CN2017/088376, filed on Jun. 15, 2017. The disclosures of the aforementioned applications are hereby incorporated by reference in their entireties.

TECHNICAL FIELD

The present disclosure relates generally to a system and method for wireless communication, and, in particular embodiments, to a system and method for frequency location indexing for wideband component carrier.

BACKGROUND

5th generation mobile networks (5G) are the proposed next generation of telecommunications standards beyond the current 4G standards. Some goals of 5G include higher capacity than current 4G, thereby allowing a higher density of mobile broadband users. 5G also proposes to support device-to-device, ultra-reliable, and massive machine communications. Additionally, 5G proposes to provide faster data transfer rates than are currently available. However, in order to achieve these goals, a number of problems must be addressed and solved. One problem to overcome is providing user equipment (UEs) with reference signals in a system in which the UE may not know the bandwidth of its component carrier (CC) and in a system that may include UEs that operate in intra-band carrier aggregation (CA) mode and UEs that operate in a single wideband mode.

SUMMARY

Technical advantages are generally achieved by embodiments of this disclosure which describe systems and methods for frequency location indexing in a user equipment (UE) in wideband CC. An advantage of one or more embodiments of the present disclosure is frequency location indexing that is the same for all devices in a network regardless of whether the UE operates in a single normal CC mode, in intra-band CA mode or in a single wideband mode. Another advantage of one or more embodiments of the present disclosure is that the frequency location indexing may be performed without knowledge of the CC bandwidth. Other advantages will be apparent to those of ordinary skill in the art upon reading the disclosure below.

In accordance with an embodiment of the present disclosure, a method for resource block (RB) indexing in a user equipment (UE) includes obtaining, at the UE, a UE-independent frequency reference point. The method also includes determining, by the UE, a UE-independent index of an RB according to the UE-independent frequency reference point.

In accordance with an embodiment of the present disclosure, a method for resource block (RB) indexing in a base station includes transmitting, to a user equipment (UE), a UE-independent frequency reference point. The UE-independent frequency reference point is for determining a UE-independent index of an RB.

In accordance with an embodiment of the present disclosure, a user equipment (UE) includes a non-transitory memory storage comprising instructions and one or more processors in communication with the non-transitory memory storage. The one or more processors execute instructions for obtaining a UE-independent frequency reference point. The one or more processors also execute instructions for determining a UE-independent index of an RB according to the UE-independent frequency reference point.

In accordance with an embodiment of the present disclosure, a base station includes a non-transitory memory storage comprising instructions and one or more processors in communication with the non-transitory memory storage. The one or more processors execute instructions for transmitting, to a user equipment (UE), a UE-independent frequency reference point. The UE-independent frequency reference point is for determining a UE-independent index of an RB.

Optionally, in any of the preceding aspects, the reference point is a lowest subcarrier of a lowest RB for a given numerology.

Optionally, in any of the preceding aspects, obtaining the UE-independent frequency reference point includes receiving an offset signaled in a remaining system information (RMSI). The offset is expressed in terms of a number of RBs. Obtaining the UE-independent frequency reference point also includes determining the UE-independent frequency reference point from the offset.

Optionally, in any of the preceding aspects, the method also includes receiving an SS block. The SS block is one of a plurality of SS blocks. The offset is from a lowest subcarrier of the SS block to the UE-independent frequency reference point.

Optionally, in any of the preceding aspects, the SS block of the plurality of SS blocks corresponds to the RMSI used for signaling the offset.

Optionally, in any of the preceding aspects, the offset is from a center frequency of a carrier to the UE-independent frequency reference point.

Optionally, in any of the preceding aspects, the UE-independent frequency reference point is a first frequency reference point and the UE-independent index is a first index. Before obtaining the first frequency reference point, the method further includes obtaining a second frequency reference point. The method also further includes determining a second index of another RB according to the second frequency reference point, the another RB for decoding the RMSI or a CORESET of the RMSI.

The foregoing has outlined rather broadly the features of an embodiment of the present disclosure in order that the detailed description of the disclosure that follows may be better understood. Additional features and advantages of embodiments of the disclosure will be described hereinafter, which form the subject of the claims of the disclosure. It should be appreciated by those skilled in the art that the conception and specific embodiments disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 3 is a diagram of an embodiment of a WCC;

FIG. 4 is a diagram of an embodiment of a system of physical resource blocks (PRBs) in the frequency domain;

FIGS. 5-10 are block diagrams each illustrating various options for identifying the reference point as a location of a DL DC subcarrier of WCC with reference to a common BWP;

FIG. 11 is a diagram of an embodiment of a system of subcarriers in the frequency domain showing fixed uniform distance between consecutive SS blocks in a WCC;

FIG. 12 is a diagram of an embodiment of a system of subcarriers in the frequency domain showing fixed uniform distance between consecutive SS blocks in a WCC;

FIG. 18 is a diagram of a graph illustrating an example of reference PRB for mixed numerologies.

FIG. 19 is a diagram of a graph of an example of mixed numerologies in FDM manner.

FIG. 20 is a flowchart of an embodiment of a method 2100 for determining a frequency location indexing in wideband CC FIG. 21 is a block diagram of component modules.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
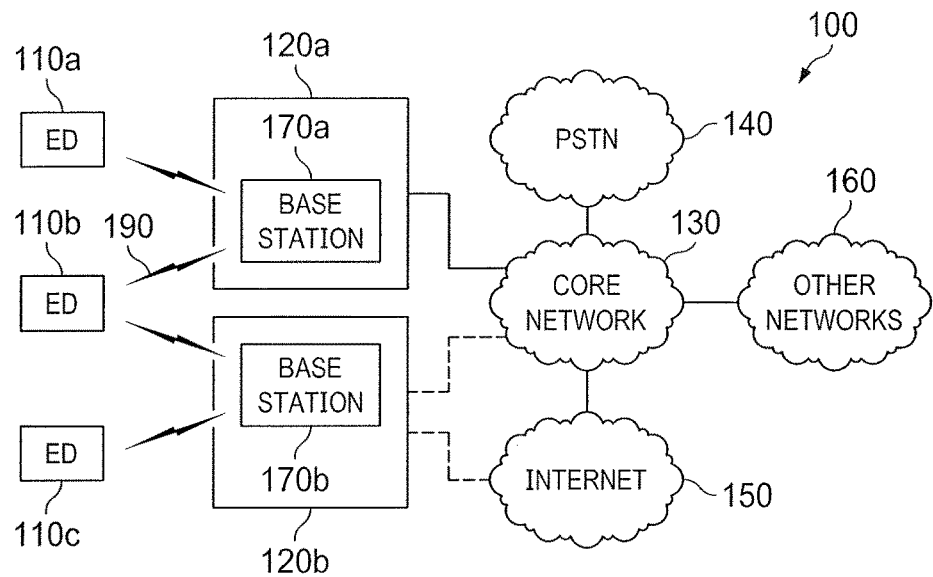
FIG. 1 is a network diagram of a communication system.

It should be understood at the outset that although an illustrative implementation of one or more embodiments are provided below, the disclosed systems and/or methods may be implemented using any number of techniques, whether currently known or not. The disclosure should in no way be limited to the illustrative implementations, drawings, and techniques illustrated below, including the exemplary designs and implementations illustrated and described herein, but may be modified within the scope of the appended claims along with their full scope of equivalents.

5G New Radio (NR) wideband CC will support several features. A basestation (e.g., a gNB) can operate simultaneously as wideband CC for some UEs and as a set of intra-band contiguous CCs with CA for other UEs. It is beneficial to allow zero guardband between CCs within wideband CC and the lack of a guardband for certain scenarios should be taken it into account when performing channel raster. If there are scenarios where guard band is considered necessary, it may be beneficial to minimize the number of subcarriers for guardband between CCs within wideband CC. Additionally, 5G NR will likely support single and multiple synchronization signal (SS) block transmissions in wideband CC in the frequency domain. For non CA UE with a smaller BW capability and potentially for CA UE, the measurement gap for RRM measurement and potentially other purposes (e.g., path loss measurement for UL power control) using SS block will be supported (if it is agreed that there is no SS block in the active BW part(s)). The UE may be informed of the presence and parameters of the SS block(s) and parameters used for RRM measurement via either, for example, RMSI signaling, other system information, or RRC signaling.

In terms of how UEs access the wideband carrier, UEs can be categorized into two types: Type A and Type B. Type A UEs operate in intra-band carrier aggregation (CA) mode (contiguous or non-contiguous). Type B UEs operate in single wideband mode. Both types of UEs need to use DL reference signals (RS) such as DMRS and CSI-RS for different purposes. Since each DL RS sequence is a function of a frequency location index (together with some other parameters), it is more efficient that all types of UEs use the same frequency location indexing for the purpose of DL RS sequence generation. In NR, it is possible that the UE may not know the bandwidth of its component carrier (CC). Therefore, the frequency location indexing should be agnostic to the CC bandwidth.

Disclosed herein are systems and methods for using a reference point for frequency location indexing. More specifically, embodiments of the present disclosure may use a single frequency reference point for frequency location indexing for reference signal generation by all types UEs in a wideband component carrier. In various embodiments, the reference point may be one of the following: 1) a predefined reference point with respect to the location of reference SS block; 2) the location of a (downlink) DC subcarrier of wideband CC; or 3) the location of the reference point is signaled through remaining minimum system information (RMSI) or other system information. In an embodiment, there are two types of carriers: 1) Wideband Component Carrier (WCC) and 2) Normal Component Carrier (NCC).

In accordance with an embodiment of the present disclosure, a method for resource block (RB) indexing in a user equipment (UE) includes obtaining, at the UE, a UE-independent frequency reference point. The method also includes determining, by the UE, a UE-independent index of an RB according to the UE-independent frequency reference point.

In accordance with an embodiment of the present disclosure, a method for resource block (RB) indexing in a base station includes transmitting, to a user equipment (UE), a UE-independent frequency reference point. The UE-independent frequency reference point is for determining a UE-independent index of an RB.

In accordance with an embodiment of the present disclosure, a user equipment (UE) includes a non-transitory memory storage comprising instructions and one or more processors in communication with the non-transitory memory storage. The one or more processors execute instructions for obtaining a UE-independent frequency reference point. The one or more processors also execute instructions for determining a UE-independent index of an RB according to the UE-independent frequency reference point.

In accordance with an embodiment of the present disclosure, a base station includes a non-transitory memory storage comprising instructions and one or more processors in communication with the non-transitory memory storage. The one or more processors execute instructions for transmitting, to a user equipment (UE), a UE-independent frequency reference point. The UE-independent frequency reference point is for determining a UE-independent index of an RB.

In accordance with an embodiment of the present disclosure, a method for frequency location indexing in a user equipment (UE) for wideband component carrier (CC) includes receiving, at the UE, a UE independent frequency reference point. The method also includes determining, by the UE, the UE independent frequency location index of a frequency location according to the UE independent frequency reference point.

In accordance with an embodiment of the present disclosure, a wireless device for frequency location indexing for wideband component carrier (CC) includes a non-transitory memory storage comprising instructions and one or more processors in communication with the non-transitory memory storage. The one or more processors execute the instructions for receiving, at the UE, a UE independent frequency reference point. The one or more processors also execute the instructions for determining, by the UE, the UE independent frequency location index of a frequency location according to the UE independent frequency reference point.

In accordance with an embodiment of the present disclosure, a non-transitory computer-readable medium storing computer instructions for frequency location indexing for wideband component carrier (CC), that when executed by one or more processors, cause the one or more processors to receive, at the UE, a UE independent frequency reference point. The instructions, when executed by the one or more processors, also cause the one or more processors to determine, by the UE, the UE independent frequency location index of a frequency location according to the UE independent frequency reference point.

Optionally, in any of the preceding aspects, the reference point is a lowest subcarrier of a lowest RB for a given numerology.

Optionally, in any of the preceding aspects, obtaining the UE-independent frequency reference point includes receiving an offset signaled in a remaining system information (RMSI). The offset is expressed in terms of a number of RBs. Obtaining the UE-independent frequency reference point also includes determining the UE-independent frequency reference point from the offset.

Optionally, in any of the preceding aspects, the method also includes receiving an SS block. The SS block is one of a plurality of SS blocks. The offset is from a lowest subcarrier of the SS block to the UE-independent frequency reference point.

Optionally, in any of the preceding aspects, the SS block of the plurality of SS blocks corresponds to the RMSI used for signaling the offset.

Optionally, in any of the preceding aspects, the offset is from a center frequency of a carrier to the UE-independent frequency reference point.

Optionally, in any of the preceding aspects, the UE-independent frequency reference point is a first frequency reference point and the UE-independent index is a first index. Before obtaining the first frequency reference point, the method further includes obtaining a second frequency reference point. The method also further includes determining a second index of another RB according to the second frequency reference point, the another RB for decoding the RMSI or a CORESET of the RMSI.

Optionally, in any of the preceding aspects, another implementation of the aspect provides that the frequency location comprises a physical resource block (PRB).

Optionally, in any of the preceding aspects, another implementation of the aspect provides that the reference point comprises a predefined reference point with respect to a location of a reference synchronization signal (SS) block.

Optionally, in any of the preceding aspects, another implementation of the aspect provides that the reference point comprises a starting subcarrier or starting physical resource block (PRB) of the reference SS block.

Optionally, in any of the preceding aspects, another implementation of the aspect provides that the reference point comprises a last subcarrier or last physical resource block (PRB) of the reference SS block.

Optionally, in any of the preceding aspects, another implementation of the aspect provides that the reference point comprises a middle subcarrier, a middle physical resource block (PRB), or center frequency of the reference SS block.

Optionally, in any of the preceding aspects, another implementation of the aspect provides that the reference point comprises a predefined subcarrier or predefined physical resource block (PRB) within the reference SS block.

Optionally, in any of the preceding aspects, another implementation of the aspect provides that the reference point comprises a predefined subcarrier or predefined physical resource block (PRB) within a common resource region for receiving remaining minimum system information (RMSI) of the SS block.

Optionally, in any of the preceding aspects, another implementation of the aspect provides that the reference point comprises a predefined subcarrier or physical resource block (PRB) outside of the reference SS block, the predefined subcarrier or predefined physical resource block (PRB) having a predefined offset with respect to a specified part of the reference SS block.

Optionally, in any of the preceding aspects, another implementation of the aspect provides that the frequency location index of a physical resource block (PRB) is determined according to a distance of the PRB to a reference point.

Optionally, in any of the preceding aspects, another implementation of the aspect provides that the distance is provided in a number of PRBs.

Optionally, in any of the preceding aspects, another implementation of the aspect provides that the reference SS block comprises a single SS block within a wideband component carrier (WCC).

Optionally, in any of the preceding aspects, another implementation of the aspect provides that the method further includes receiving an SS block, wherein the SS block is one of a plurality of SS blocks, wherein a frequency distance between consecutive one of the plurality of SS blocks is fixed and predefined, and wherein the reference point is determined according to the SS block.

Optionally, in any of the preceding aspects, another implementation of the aspect provides that the distance between consecutive ones of the plurality of SS blocks is uniform.

Optionally, in any of the preceding aspects, another implementation of the aspect provides that the distance between a first pair of consecutive ones of the plurality of SS blocks is different from the distance between a second pair of consecutive ones of the plurality of SS blocks.

Optionally, in any of the preceding aspects, another implementation of the aspect provides that a relative frequency distance of SS blocks is signaled in system information.

Optionally, in any of the preceding aspects, another implementation of the aspect provides that the system information comprises remaining minimum system information (RMSI).

Optionally, in any of the preceding aspects, another implementation of the aspect provides that the frequency location indexing for sequences generated used for RMSI and its control resource set (CORESET) is different from the frequency location indexing for sequences used for unicast data and so a specific reference signal (RS) is used for the RMSI and its CORESET.

Optionally, in any of the preceding aspects, another implementation of the aspect provides that a frequency index of each of the plurality of SS blocks is signaled in a corresponding system information.

Optionally, in any of the preceding aspects, another implementation of the aspect provides that the system information comprises one of a physical broadcast channel (PBCH) or an RMSI.

Optionally, in any of the preceding aspects, another implementation of the aspect provides that the reference point comprises a location of a downlink direct current (DC) subcarrier of a wideband component carrier (WCC).

Optionally, in any of the preceding aspects, another implementation of the aspect provides that a part of the DC information is signaled in a physical broadcast channel (PBCH).

Optionally, in any of the preceding aspects, another implementation of the aspect provides that the reference point is determined according to a predefined location of the DC in a common bandwidth part (BWP) if the DC is present in the common BWP.

Optionally, in any of the preceding aspects, another implementation of the aspect provides that a location of the DC is provided as an offset with respect to a reference point of the SS block or a reference point of a common bandwidth part (BWP).

Optionally, in any of the preceding aspects, another implementation of the aspect provides that the reference point is signaled through system information.

Optionally, in any of the preceding aspects, another implementation of the aspect provides that the system information comprises remaining minimum system information (RMSI).

Optionally, in any of the preceding aspects, another implementation of the aspect provides that the reference point comprises a predefined subcarrier or a predefined physical resource block (PRB) within the reference SS block.

Optionally, in any of the preceding aspects, another implementation of the aspect provides that the reference point comprises a predefined subcarrier or a predefined physical resource block (PRB) within a common resource region for receiving remaining minimum system information (RMSI) of the SS block.

Optionally, in any of the preceding aspects, another implementation of the aspect provides that the reference point comprises a predefined subcarrier or predefined physical resource block (PRB) outside of the reference SS block, the predefined subcarrier or PRB having a predefined offset with respect to a specified part of the reference SS block.

Optionally, in any of the preceding aspects, another implementation of the aspect provides that the method further includes obtaining a default numerology of a reference physical resource block (PRB) and determining a numerology of a first PRB according to the default numerology.

Optionally, in any of the preceding aspects, another implementation of the aspect provides that the frequency reference point of a first numerology is determined according to the frequency reference point of a default numerology using a predefined rule.

Optionally, in any of the preceding aspects, another implementation of the aspect provides that the predefined rule for a numerology with subcarrier spacing (SCS) smaller than the default SCS defines the reference physical resource block (PRB) as a specified PRBs among the PRBs that are included in the reference PRB of the default numerology.

Optionally, in any of the preceding aspects, another implementation of the aspect provides that the specified PRB is predefined or signaled through system information.

Optionally, in any of the preceding aspects, another implementation of the aspect provides that the reference PRB of SCS $2^{-n}f_0$, with n≥1 comprises a $k_n$'th PRB among the PRBs included in the reference PRB of the default SCS $f_0$.

Optionally, in any of the preceding aspects, another implementation of the aspect provides that $k_n$ is one of 1, $2^n$, $2^n-1$, $2^{n-1}+1$, and min(k, 2n).

Optionally, in any of the preceding aspects, another implementation of the aspect provides that the reference PRB of SCS $2^{-n}f_0$, with n≥1 comprises a last PRB if n is odd and a first PRB if n is even among the PRBs included in the reference PRB of SCS $2^{-n}+f_0$.

Optionally, in any of the preceding aspects, another implementation of the aspect provides that the reference PRB of SCS $2^{-n}f_0$, with n≥1 comprises a first PRB if n is odd and a last PRB if n is even among the PRBs included in the reference PRB of SCS $2^{-n}+1f_0$.

Optionally, in any of the preceding aspects, another implementation of the aspect provides that the predefined rule for a numerology with subcarrier spacing (SCS) larger than the default SCS is used to derive a PRB grid and a reference PRB of a larger SCS from the reference PRB of the default SCS.

Optionally, in any of the preceding aspects, another implementation of the aspect provides that, for any SCS $2^n f_0$, with n≥1, the reference PRB of SCS $2^n f_0$ is left-aligned with the reference PRB of the default SCS $f_0$.

Optionally, in any of the preceding aspects, another implementation of the aspect provides that, for any SCS $2^n f_0$, with n≥1, the reference PRB of SCS $2^n f_0$ is right-aligned with the reference PRB of the default SCS $f_0$.

Optionally, in any of the preceding aspects, another implementation of the aspect provides that, for any SCS $2^n f_0$, with n≥1, if n is odd, the reference PRB of SCS $2^{n-1} f_0$ is right-aligned with the reference PRB of SCS $2^n f_0$ and if n is even, the reference PRB of SCS $2^{n-1} f_0$ is left-aligned with the reference PRB of SCS $2^n f_0$.

Optionally, in any of the preceding aspects, another implementation of the aspect provides that, for any SCS $2^n f_0$, with $n \geq 1$, if n is odd, the reference PRB of SCS $2^{n-1} f_0$ is left-aligned with the reference PRB of SCS $2^n f_0$ and if n is even, the reference PRB of SCS $2^{n-1} f_0$ is right-aligned with the reference PRB of SCS $2^n f_0$.

Optionally, in any of the preceding aspects, another implementation of the aspect provides that only one SS block in a frequency domain has a corresponding RMSI and that the only one SS block is the reference SS block.

Optionally, in any of the preceding aspects, another implementation of the aspect provides that one bit in a PBCH of an SS block indicates whether the SS block is a reference SS block.

Optionally, in any of the preceding aspects, another implementation of the aspect provides that the frequency location indexing for sequences generated used for RMSI and its CORESET is the same as the frequency location indexing for sequences used for unicast data.

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, narrowcast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such.

Figure 2A:
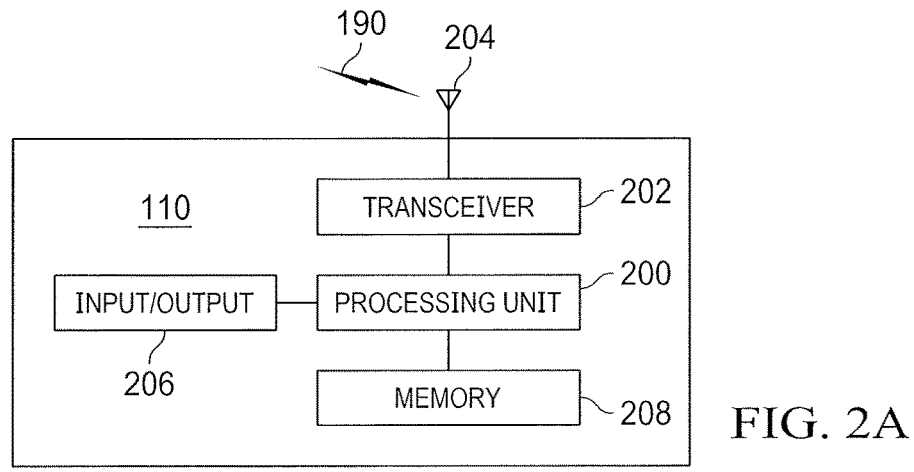
FIG. 2A is a block diagram of an example electronic device.
Figure 2B:
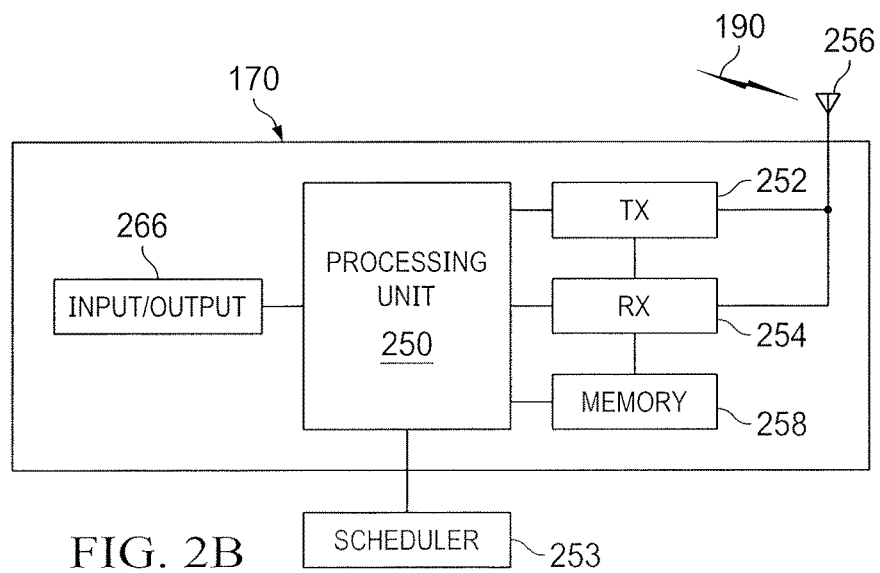
FIG. 2B is a block diagram of an example electronic device.

FIGS. 2A and 2B illustrate example devices that may implement the methods and teachings according to this disclosure. In particular, FIG. 2A illustrates an example ED 110, and FIG. 2B illustrates an example base station 170. These components could be used in the communication system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Frame structures have been proposed that are flexible in terms of the use of differing numerologies. A numerology is defined as the set of physical layer parameters of the air interface that are used to communicate a particular signal. A numerology is described in terms of at least subcarrier spacing and OFDM symbol duration, and may also be defined by other parameters such as fast Fourier transform (FFT)/inverse FFT (IFFT) length, transmission time slot length, and cyclic prefix (CP) length or duration. In some implementations, the definition of the numerology may also include which one of several candidate waveforms is used to communicate the signal. Possible waveform candidates may include, but are not limited to, one or more orthogonal or non-orthogonal waveforms selected from the following: Orthogonal Frequency Division Multiplexing (OFDM), Filtered OFDM (f-OFDM), Filter Bank Multicarrier (FBMC), Universal Filtered Multicarrier (UFMC), Generalized Frequency Division Multiplexing (GFDM), Single Carrier Frequency Division Multiple Access (SC-FDMA), Low Density Signature Multicarrier Code Division Multiple Access (LDS-MC-CDMA), Wavelet Packet Modulation (WPM), Faster Than Nyquist (FTN) Waveform, low Peak to Average Power Ratio Waveform (low PAPR WF), Pattern Division Multiple Access (PDMA), Lattice Partition Multiple Access (LPMA), Resource Spread Multiple Access (RSMA), and Sparse Code Multiple Access (SCMA).

These numerologies may be scalable in the sense that subcarrier spacings of different numerologies are multiples of each other, and time slot lengths of different numerologies are also multiples of each other. Such a scalable design across multiple numerologies provides implementation benefits, for example scalable total OFDM symbol duration in a time division duplex (TDD) context.

Table 1 below shows the parameters associated with some example numerologies, in the four columns under "Frame structure". Frames can be configured using one or a combination of the four scalable numerologies. For comparison purposes, in the right hand column of the table, the conventional fixed LTE numerology is shown. The first column is for a numerology with 60 kHz subcarrier spacing, which also has the shortest OFDM symbol duration because OFDM symbol duration varies inversely with subcarrier spacing. This may be suitable for ultra-low latency communications, such as Vehicle-to-Any (V2X) communications. The second column is for a numerology with 30 kHz subcarrier spacing. The third column is for a numerology with 15 kHz subcarrier spacing. This numerology has the same configuration as in LTE, except there are only 7 symbols in a time slot. This may be suitable for broadband services. The fourth column is for a numerology with 7.5 kHz spacing, which also has the longest OFDM symbol duration among the four numerologies. This may be useful for coverage enhancement and broadcasting. Additional uses for these numerologies will be or become apparent to persons of ordinary skill in the art. Of the four numerologies listed, those with 30 kHz and 60 kHz subcarrier spacings are more robust to Doppler spreading (fast moving conditions), because of the wider subcarrier spacing. It is further contemplated that different numerologies may use different values for other physical layer parameters, such as the same subcarrier spacing and different cyclic prefix lengths.

It is further contemplated that other subcarrier spacings may be used, such as higher or lower subcarrier spacings. As illustrated in the example above, the subcarrier spacing of each numerology (7.5 kHz, 15 kHz, 30 kHz, 60 kHz) can be a factor of $2^n$ times the smallest subcarrier spacing, where n is an integer. Larger subcarrier spacings that are also related by a factor of $2^n$, such as 120 kHz, may also or alternatively be used. Smaller subcarrier spacings that are also related by a factor of $2^n$, such as 3.75 kHz, may also or alternatively be used. The symbol durations of the numerologies may also be related by a factor of $2^n$. Two or more numerologies that are related in this way are sometimes referred to as scalable numerologies.

In other examples, a more limited scalability may be implemented, in which two or more numerologies all have subcarrier spacings that are integer multiples of the smallest subcarrier spacing, without necessarily being related by a factor of $2^n$. Examples include 15 kHz, 30 kHz, 45 kHz, 60 kHz, 120 kHz subcarrier spacings.

In still other examples, non-scalable subcarrier spacings may be used, which are not all integer multiples of the smallest subcarrier spacing, such as 15 kHz, 20 kHz, 30 kHz, 60 kHz.

In Table 1, each numerology uses a first cyclic prefix length for a first number of OFDM symbols, and a second cyclic prefix length for a second number of OFDM symbols. For example, in the first column under "Frame structure", the time slot includes 3 symbols with a cyclic prefix length of 1.04 μs followed by 4 symbols with a cyclic prefix length of 1.3 μs.

TABLE 1

| Parameters | Frame structure | | | | Baseline (LTE) |
| --- | --- | --- | --- | --- | --- |
| time slot Length | 0.125 ms | 0.25 ms | 0.5 ms | 1 ms | TTI = 1 ms |
| Subcarrier spacing | 60 kHz | 30 kHz | 15 kHz | 7.5 kHz | 15 kHz |
| FFT size | 512 | 1024 | 2048 | 4096 | 2048 |
| Symbol duration | 16.67 μs | 33.33 μs | 66.67 μs | 133.33 μs | 66.67 μs |
| #symbols in each time slot | 7 (3,4) | 7 (3,4) | 7 (3,4) | 7 (3,4) | 14 (2,12) |
| CP length | 1.04 μs, 1.30 μs (32,40 point) | 2.08 μs, 2.60 μs (64,80 point) | 4.17 μs, 5.21 μs (128,160 point) | 8.33 μs, 10.42 μs (256,320 point) | 5.2 μs, 4.7 μs (160,144 point) |
| CP overhead | 6.67% | 6.67% | 6.67% | 6.67% | 6.67% |
| BW (MHz) | 20 | 20 | 20 | 20 | 20 |

In Table 2, an example set of numerologies is shown, in which different cyclic prefix lengths can be used in different numerologies having the same subcarrier spacing.

TABLE 2

Example numerology with different CP lengths

| Subcarrier spacing (kHz) | 15 | 30 | 30 | 60 | 60 | 60 |
|---|---|---|---|---|---|---|
| Useful duration $T_u$ (µs) | 66.67 | 33.33 | 33.33 | 16.67 | 16.67 | 16.67 |
| CP length (µs) (1) | 5.2 | 5.73 | 2.6 | 2.86 | 1.3 | 3.65 |
| CP length (µs) (6 or 12) | 4.7 | 5.08 | 2.34 | 2.54 | 1.17 | 3.13 |
| # of symbols per TTI | 7(1, 6) | 13(1, 12) | 7(1, 6) | 13(1, 12) | 7(1, 6) | 25(10, 15) |
| TTI (ms) | 0.5 | 0.5 | 0.25 | 0.25 | 0.125 | 0.5 |
| CP overhead | 6.70% | 13.30% | 6.70% | 13.30% | 6.70% | 16.67% |

It should be understood that the specific numerologies of the examples of Tables 1 and 2 are for illustration purposes, and that a flexible frame structure combining other numerologies can alternatively be employed.

OFDM-based signals can be employed to transmit a signal in which multiple numerologies coexist simultaneously. More specifically, multiple sub-band OFDM signals can be generated in parallel, each within a different sub-band, and each sub-band having a different subcarrier spacing (and more generally with a different numerology). The multiple sub-band signals are combined into a single signal for transmission, for example for downlink transmissions. Alternatively, the multiple sub-band signals may be transmitted from separate transmitters, for example for uplink transmissions from multiple electronic devices (EDs), which may be user equipment (UEs). In a specific example, filtered OFDM (f-OFDM) can be employed by using filtering to shape the frequency spectrum of each sub-band OFDM signal, thereby producing a frequency localized waveform, and then combining the sub-band OFDM signals for transmission. f-OFDM lowers out-of-band emission and improves transmission, and addresses the non-orthogonality introduced as a result of the use of different subcarrier spacings. Alternatively, a different approach can be used to achieve a frequency localized waveform, such as windowed OFDM (W-OFDM).

The use of different numerologies can allow the coexistence of a diverse set of use cases having a wide range quality of service (QoS) requirements, such as different levels of latency or reliability tolerance, as well as different bandwidth or signaling overhead requirements. In one example, the base station can signal to the ED an index representing a selected numerology, or a single parameter (e.g., subcarrier spacing) of the selected numerology. The signaling can be done in a dynamic or a semi-static manner, for example in a control channel such as the physical downlink control channel (PDCCH) or in downlink control information (DCI). Based on this signaling, the ED may determine the parameters of the selected numerology from other information, such as a look-up table of candidate numerologies stored in memory.

FIG. 3 is a diagram of an embodiment of a WCC 302. WCC 302 includes a plurality of normal component carriers (NCCs) 304. Each NCC 304 includes a plurality of subcarriers each with a specified bandwidth. The WCC 302 also includes a plurality of SS blocks 308. The WCC 302 also includes a reference point 306. The reference point 306 is used for frequency location indexing. In an embodiment, the reference point 306 is a predefined reference point with respect to the location of a reference SS block. For example, the reference point 306 is a distance $\Delta_o$ from the beginning of a reference SS block 308, a distance $\Delta_1$ from the beginning of a second reference SS block 308, and a distance $\Delta_2$ from a third reference SS block 308. The distance may be measured in the number of subcarriers between the reference point 306 and the particular reference SS block 308 or may be measured in the number of physical resource blocks (PRBs) between the reference point 306 and the particular reference SS block 308 or may be measured in difference in frequency. Other methods of distance measurement may also be used.

In an embodiment, the same frequency location indexing for RS sequence generation is used for both RMSI and unicast data. The reference point for the RS sequence generation is obtained by the UE before decoding the RMSI. The reference point is used to generate the RS sequences for both RMSI and all unicast data such as NR-PDSCH. In one embodiment, the same type of sequence generation is used for RMSI and its CORESET and for unicast data. In one embodiment, the downlink DC subcarrier of wideband CC is taken as the reference point. In another embodiment, an SS block is taken as the reference SS block with respect to which the reference point is obtained.

In embodiment in which the downlink DC subcarrier of wideband CC is taken as the reference point, the DC location is signaled in PBCH of each SS block. The location of DC is represented as an offset with respect to a predefined point in the SS block or a predefined point in the common BWP.

In embodiment in which an SS block is taken as the reference SS block, in one embodiment, only one SS block in frequency has a corresponding RMSI. This SS block is the reference SS block and a predefined point with respect to this SS block is taken as the reference point. In the case of multiple SS blocks in frequency in wideband CC, only one of them has a corresponding RMSI. All UEs in wideband CC need to detect this SS block to be able to obtain the reference point. The indication of this SS block can be done through PBCH by indicating whether or not there is a corresponding RMSI to the SS block. The SS block that has a corresponding RMSI according to the indication in its PBCH is taken as the reference SS block by the UE. In a second embodiment, one bit in PBCH indicates whether the SS block can be considered as the reference SS block. If an SS block is indicated as the reference SS block, a predefined point with respect to this SS block is taken as the reference point.

In another embodiment, different frequency location indexings for sequence generation are used for RMSI (and its CORESET) and unicast data. UE needs to first decode RMSI to be able to obtain the reference point. A specific RS is used for control resource set (CORESET) of RMSI and NR-PDSCH for RMSI. After obtaining the reference point, the UE uses it to generate the RS sequences for all unicast data such as NR-PDSCH. In one embodiment, the reference point 306 is identified as a location of a downlink (DL) DC subcarrier of wideband CC. In a second embodiment, an SS block is taken the reference SS block with respect to which the reference point is obtained. In a third embodiment, the reference point 306 is signaled to a UE through system information such as, for example, remaining minimum system information (RMSI).

FIG. 4 is a diagram of an embodiment of a system 400 of physical resource blocks (PRBs) in the frequency domain. The system 400 includes a reference SS block 402. The reference SS block 402 includes a plurality of PRBs. In the depicted example, the SS block 402 includes PRB #-1, a reference PRB 404, PRB #1, and PRB #2. In an embodiment, the reference point is a predefined reference point with respect to the frequency location of a reference SS block 402. In the case in which only a single SS block is transmitted within a WCC, the reference point can be defined as one of the PRBs (i.e., the reference PRB 404) within the reference SS block 402. All other PRBs may be indexed based on their distance from the reference PRB 404 as either −1, −2, etc. for PRBs with lower frequencies than the reference PRB 404 or 1, 2, etc. for PRBs with higher frequencies than the reference PRB. The numbers 1, −1, 2, −2, etc., indicate whether the PRB is the $1^{st}$ PRB (i.e., PRB #1) after the reference PRB 404, the $1^{st}$ PRB (i.e., PRB #-1) before the reference PRB 404, the $2^{nd}$ PRB (i.e., PRB #2) after the reference PRB 404, the $2^{nd}$ PRB (i.e., PRB #-2) before the reference PRB 404, etc.

If an SS block is taken as the reference SS block, then the following options may be used to identify a reference point as a specific point relative to the reference SS block. The reference point may be, for example, one of the following: 1) the starting subcarrier or PRB of the reference SS block, 2) the last subcarrier or PRB of the reference SS block, 3) the middle subcarrier or middle PRGB or the center frequency of the reference SS block, 4) a specific predefined subcarrier or PRB within the reference SS block, 5) a specific predefined subcarrier or PRB within the common resource region for receiving RMSI (sometimes referred to as the common bandwidth part or common BWP) of the reference SS block, or 6) a specific predefined subcarrier or PRB outside of the reference SS block with a known offset with respect to the beginning, end, middle, or any other reference point of the reference SS block.

FIGS. 5-10 are block diagrams each illustrating an option 500, 600, 700, 800, 900, 1000 for identifying the reference point as a specific point relative to the reference SS block. In option I 500 in FIG. 5, the reference point 506 is a first PRB of the reference SS block 504 in the common BWP 502. In option II 600 in FIG. 6, the reference point 606 is the last PRB of the reference SS block 604 within the common BWP 602. In option III 700 in FIG. 7, the reference point 706 is one of the middle SS PRBs of the reference SS block 704 within common BWP 702. In option IV 800 in FIG. 8, the reference point 806 is a specific PRB within the reference SS block 804 in common BWP 802. In option V 900 in FIG. 9, the reference point 906 is a specific PRB outside of the reference SS block 904 but within the common BWP 902. In option VI 1000 in FIG. 10, the reference point 1006 is a specific PRB outside both the reference SS block 1004 and the common BWP 1002.

In an embodiment, the frequency index of any PRB is determined by its distance (in number of PRBs) to the reference point.

In embodiments in which the WCC includes a single SS block, the reference SS block is the single SS block within the WCC.

If the WCC includes multiple SS blocks, the relative distance between SS blocks may be fixed or signaled. If the relative frequency distance of SS blocks is fixed and predefined, the distance may be fixed and uniform or fixed and non-uniform.

FIG. 11 is a diagram of an embodiment of a system 1100 of subcarriers in the frequency domain showing fixed uniform distance between consecutive SS blocks 1104, 1106, 1108 in a WCC. System 1100 includes a WCC 1102 having three SS blocks 1104, 1106, 1108. The distance, Δf between consecutive pairs of SS blocks 1104, 1106, 1108 is the same for all consecutive pairs of SS blocks 1104, 1106, 1108 (e.g., between SS block 1104 and SS block 1106 or between SS block 1106 and SS block 1108).

FIG. 12 is a diagram of an embodiment of a system 1200 of subcarriers in the frequency domain showing fixed uniform distance between consecutive SS blocks 1204, 1206, 1208 in a WCC. The distance, $\Delta f_1$ between a first consecutive pair of SS blocks 1204, 1206 (i.e., between SS block 1204 and SS block 1206) is different from the distance, $\Delta f_2$, between a second consecutive pair of SS blocks 1206, 1208 (i.e., between SS block 1206 and SS block 1208).

If the relative frequency distance of SS blocks is signaled in system information such as, for example, RMSI, the relative frequency distance can again be either uniform or non-uniform between consecutive SS blocks as illustrated in FIGS. 11 and 12.

In an embodiment, the frequency index of each SS block (i.e., SS block #i in FIGS. 11 and 12) is signaled in its corresponding PBCH, RMSI, or other system information.

In an embodiment, all UEs (both types A and B) obtain the same frequency location indexing as follows. First, the detected SS block is taken as the reference SS block. If more than one SS blocks are detected, any of them can be taken as the reference SS block. Assume that SS block #i is taken as the reference SS block. The frequency location index of a PRB can be determined based on one of the following methods depending on whether the distance between SS blocks is uniform or no uniform. If the distance between SS blocks is uniform, then the frequency location index, n, of a PRB is determined according to n=(distance of the PRB to the reference point of the SS block #i)+i×Δf. If the distance between SS blocks i non-uniform, then the frequency location index, n, of a PRB is determined according to n=(distance of the PRB to the reference point of the SS block #i)+$\Delta f_1$+ . . . +$\Delta f_i$. Therefore, the value of the frequency location index, n, is independent of the reference SS block.

In another embodiment, the reference point of the frequency location indexing for a uniform distance between SS blocks can be defined as reference point=(the reference point of SS block #i)−i×Δf. The reference point of the frequency location indexing for a non-uniform distance between SS blocks can be defined as reference point=(the reference point of SS block #i)−($\Delta f_1$+ . . . +$\Delta f_i$). Then, in either case, the frequency location index of a PRB, n, is the distance of the PRB to the reference point.

In another embodiment, one of the multiple SS blocks in WCC is predefined as reference SS block, e.g. SS block #j. Each UE after detecting one of the SS blocks, e.g. SS block #i, and obtaining the value of i from its corresponding PBCH, RMSI, or other system information, and after obtaining the relative frequency distance of SS blocks through system information, such as RMSI, is able to find the location of the reference SS block, i.e. SS block #j. Then, it can determine the location of the reference point by using the predefined offset and the location of the reference SS block.

In another embodiment, in which the reference point is identified as a location of a DL DC subcarrier of WCC, a number of different methods may be used to identify the reference point to the UE.

In one embodiment, part of the DC information is signaled to the UE in, for example, PBCH. The DC may or may not be present in the common BWP. If the DC is present in the common BWP, reference point is identified as a predefined location of the DC for common BWP. If the DC is not present in the common BWP, then system information signaling (e.g., RMSI) indicates the location of the DC. In this case in which the DC is not present in the common BWP, the location of the DC may be presented as an offset with respect to the reference point of the SS block or as a reference point of the common BWP. In an embodiment, the frequency location indexing for sequences generated used for RMSI and its CORESET is different from the frequency location indexing for sequences used for unicast data and so a specific RS is used for the RMSI and its CORESET.

In a second embodiment in which the reference point is identified as a location of a DL DC subcarrier of WCC, the DC location is signaled through system information such as, for example, RMSI. As with the case of signaling the reference point with respect to the location of a reference SS block, a specific predefined subcarrier or PRB within the SS block, the common BWP of the reference SS block, or a specific predefined subcarrier or PRB outside of the reference SS block with a known offset with respect to the beginning, end, middle, or any other reference point of the reference SS block may be signaled to the UE but is done through system information, such as RMSI, rather than being predefined. In an embodiment, the frequency location indexing for sequences generated used for RMSI or other system information their CORESETs is different from the frequency location indexing for sequences used for unicast data and so a specific RS is used for the RMSI or other system information and their CORESETs.

In the embodiments of the present disclosure, using a single frequency reference point for frequency location indexing allows for all types UEs (e.g., Type A intra-band carrier aggregation (CA) mode, and Type B single wideband mode) in a wideband component carrier to more efficiently generate reference signals.

In a further beneficial aspect, the disclosed methods of determining a reference point for a UE to use to determine a frequency location index in WCC are also applicable to systems that utilize mixed numerologies. In these cases, the SS blocks use a default numerology. After detecting an SS block, the PRB grid of the default numerology is obtained by the UE. In an embodiment, using a nested structure, the PRB grid of all numerologies with subcarrier spacing (SCS) smaller than a default SCS is derived from the PRB grid of the default numerology. The reference PRB of the default numerology is the PRB which includes the reference point of the default numerology. Once the reference PRB of the default numerology is known to a UE (using, for example, any of the example methods discussed above), the reference PRB of the default numerology is used to obtain the reference PRB of any other numerology.

According to embodiments of the present disclosure, frequency location indexing for RS sequence generation may be subcarrier spacing (i.e., numerology) specific. In specific embodiments described below, the reference point for frequency location indexing of each subcarrier spacing or numerology is obtained from the reference point of the default subcarrier spacing based on a predefined rule. Examples of predefined rules for providing different subcarrier spacing specific frequency location indexing are described below with reference to FIGS. 13 to 19.

For any numerology with SCS smaller than the default SCS, the reference PRB is a specified PRB among PRBs that are included in the reference PRB of the default numerology. The "specified PRB" can be predefined or signaled through RMSI or other system information.

Some alternatives for the reference PRB of SCS $2^{-n}f_0$, with $n \geq 1$ are discussed below, where $f_0$ is the default SCS.

In alternative A), the $k_n$'th PRB among the PRBs included in the reference PRB of SCS $f_0$. Examples of $k_n$ are $k_n=1$ (first PRB), $k_n=2^n$ (last PRB), $k_n=2^{n-1}$, $k_n=2^{n-1}+1$, $k_n=\min(k, 2^n)$ with k defined in the specification for the system.

In alternative B), the last PRB (if n is odd) and the first PRB (if n is even) among the PRBs included in the reference PRB of SCS $2^{-n+1}f_0$.

In alternative C), the first PRB (if n is odd) and the last PRB (if n is even) among the PRBs included in the reference PRB of SCS $2^{-n+1}f_0$.

In an embodiment, there are two alternatives for determining the PRB grid of a numerology with SCS greater than the default SCS.

In alternative i), the PRB grid of the numerology is already known to the UE (either by predefined rule or through signaling). The reference PRB of the numerology with SCS greater the default SCS is the PRB that includes the reference PRB of the default numerology.

In alternative ii), the reference PRB of the default numerology determines both the PRB grid and the reference PRB of a numerology with SCS greater than the default SCS. In this case, a predefined rule is used to derive the PRB grid and the reference PRB of a larger SCS from the reference PRB of the default SCS. In an embodiment, there are four different options for alternative ii).

In option Alt (ii)-1, for any SCS $2^n f_0$, with $n \geq 1$, the reference PRB of SCS $2^n f_0$ is left-aligned with the reference PRB of SCS $f_0$. As used herein, the "right" refers to higher frequencies and "left" refers to lower frequencies. Thus, when two reference PRBs are "left-aligned", the lowest frequencies of each reference PRB are aligned. Similarly, when two reference PRBs are "right-aligned", the highest frequencies of each reference PRB are aligned.

Figure 13:
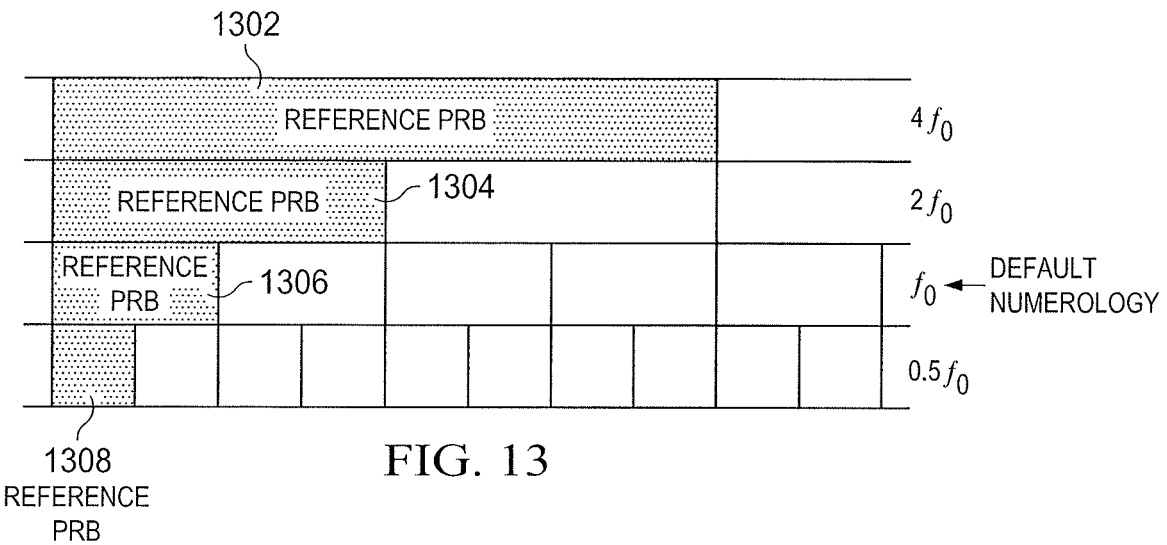
FIG. 13 is a diagram that illustrates the location of the reference PRBs for multiple different numerologies according to alternative A with $k_n=1$ for SCS $0.5f_0$ and option Alt (ii)-1 for SCS $2f_0$ and $4f_0$.

FIG. 13 is a diagram that illustrates the location of the reference PRBs for multiple different numerologies according to alternative A with $k_n=1$ for SCS $0.5f_0$ and option Alt (ii)-1 for SCS $2f_0$ and $4f_0$. The reference PRBs 1302, 1304 for numerologies with larger SCS than the SCS of the default numerology and the reference PRB 1308 for numerologies with smaller SCS than the SCS of the default numerology are left aligned with the reference PRB 1306 for the default numerology. Thus, when reference PRBs 1302, 1304, 1306, 1308 are left aligned, the lowest frequency of each reference PRB 1302, 1304, 1306, 1308 are aligned.

In option Alt (ii)-2, for any SCS $2^n f_0$, with $n \geq 1$, the reference PRB of SCS $2^n f_0$ is right-aligned with the reference PRB of SCS $f_0$.

Figure 14:
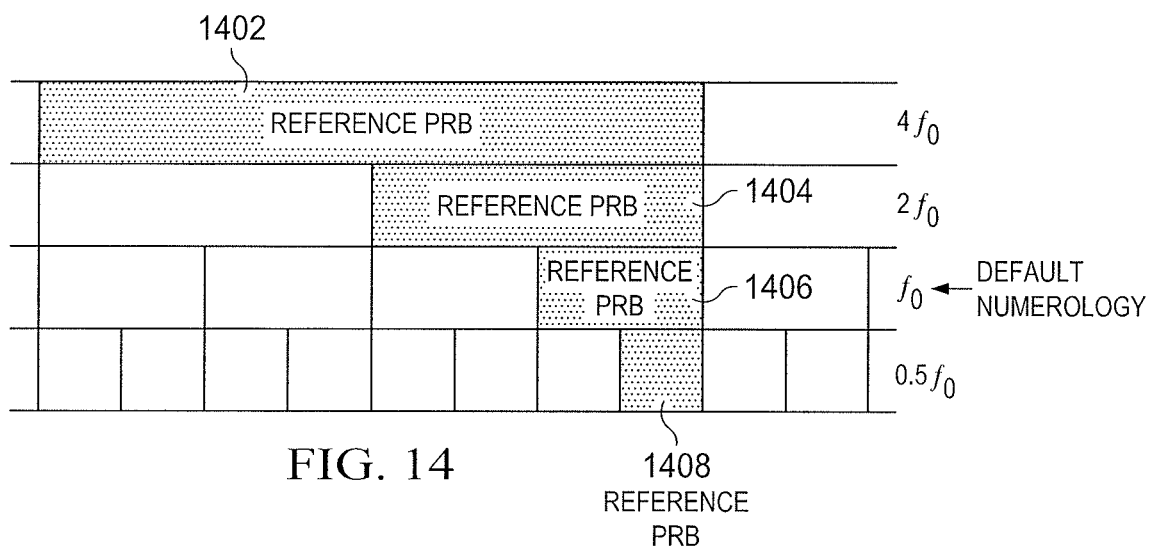
FIG. 14 is a diagram that illustrates the location of the reference PRBs for multiple different numerologies according to alternative A with $k_n=2^n$ for SCS $0.5f_0$ and option Alt (ii)-2 for SCS $2f_0$ and $4f_0$.

FIG. 14 is a diagram that illustrates the location of the reference PRBs for multiple different numerologies according to alternative A with $k_n=2^n$ for SCS $0.5f_0$ and option Alt (ii)-2 for SCS $2f_0$ and $4f_0$. The reference PRBs 1402, 1404 for numerologies with larger SCS than the SCS of the default numerology and the reference PRB 1408 for numerologies with smaller SCS than the SCS of the default numerology are right aligned with the reference PRB 1406 for the default numerology. Thus, if the reference PRBs of different numerologies are right aligned with the reference PRB of the default numerology, then the highest frequency of each reference PRB are aligned with the highest frequency of the reference PRB 1406 of the default numerology as shown in FIG. 14. Thus, reference PRBs 1402, 1404, 1406, 1408 are right aligned.

In option Alt (ii)-3, for any SCS $2^n f_0$, with n≥1, if n is odd, the reference PRB of $2^{n-1} f_0$ is right-aligned with the reference PRB of SCS $2^n f_0$. If n is even, the reference PRB of $2^{n-1} f_0$ is left-aligned with the reference PRB of SCS $2^n f_0$.

In option Alt (ii)-4, for any SCS $2^n f_0$, with n≥1, if n is odd, the reference PRB of $2^{n-1} f_0$ is left-aligned with the reference PRB of SCS $2^n f_0$. If n is even, the reference PRB of $2^{n-1} f_0$ is right-aligned with the reference PRB of SCS $2^n f_0$.

Figure 15:
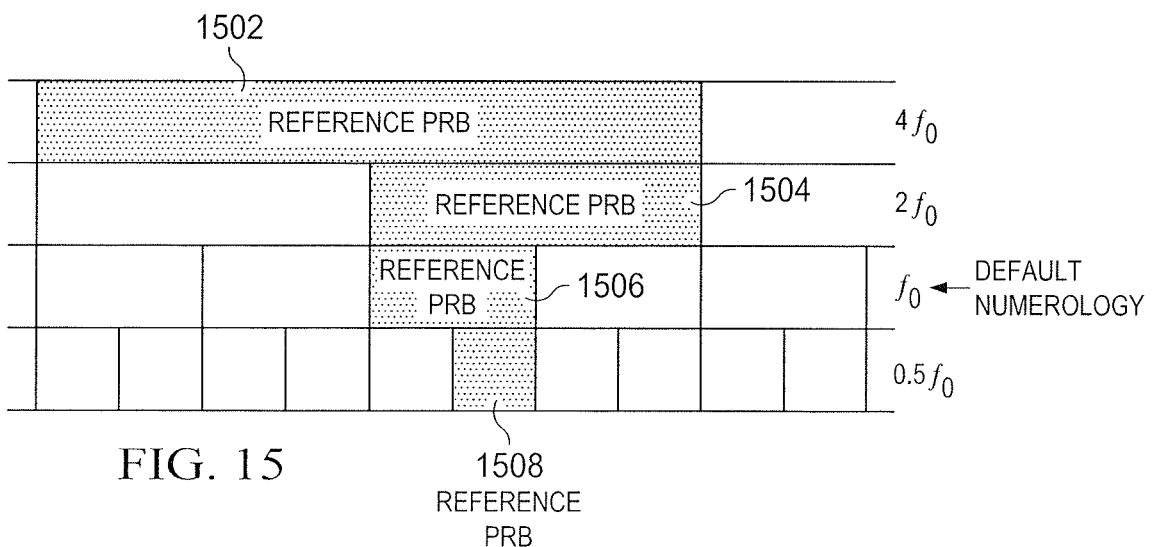
FIG. 15 is a diagram that illustrates the location of the reference PRBs for multiple different numerologies according to alternative A with $k_n=2^n$ for SCS $0.5f_0$ and option Alt (ii)-4 for SCS $2f_0$ and $4f_0$.

FIG. 15 is a diagram that illustrates the location of the reference PRBs for multiple different numerologies according to alternative A with $k_n = 2^n$ for SCS $0.5 f_0$ and option Alt (ii)-4 for SCS $2 f_0$ and $4 f_0$. The reference PRB 1504 for SCS $2 f_0$ is left aligned with the reference PRB 1506 for the default numerology. The reference PRB 1502 for SCS $4 f_0$ is right aligned with the reference PRB 1504 for SCS $2 f_0$. The reference PRB 1508 for SCS $0.5 f_0$ is right aligned with the reference PRB 1506 for the default numerology.

Figure 16:
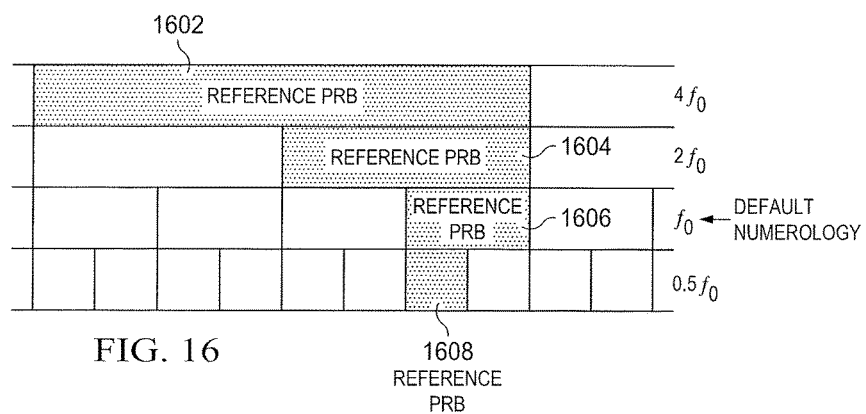
FIG. 16 is a diagram that illustrates the location of the reference PRBs for multiple different numerologies according to alternative A with $k_n=1$ for SCS $0.5f_0$ and option Alt (ii)-2 for SCS $2f_0$ and $4f_0$.

FIG. 16 is a diagram that illustrates the location of the reference PRBs for multiple different numerologies according to alternative A with $k_n = 1$ for SCS $0.5 f_0$ and option Alt (ii)-2 for SCS $2 f_0$ and $4 f_0$. The reference PRB 1604 for SCS $2 f_0$ is right aligned with the reference PRB 1606 for the default numerology. The reference PRB 1602 for SCS $4 f_0$ is right aligned with the reference PRB 1604 for SCS $2 f_0$. The reference PRB 1608 for SCS $0.5 f_0$ is left aligned with the reference PRB 1606 for the default numerology.

Figure 17:
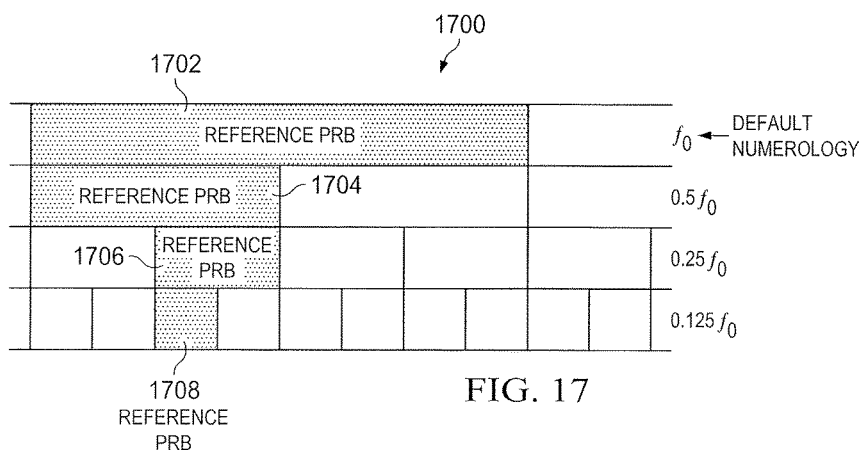
FIG. 17 is a diagram that illustrates the location of the reference PRBs for multiple different numerologies according to alternative A with $k_n=1$ for SCS $0.5f_0$ and option Alt (ii)-3 for SCS $2f_0$ and $4f_0$.

FIG. 17 is a diagram that illustrates the location of the reference PRBs for multiple different numerologies according to alternative A with $k_n = 1$ for SCS $0.5 f_0$ and option Alt (ii)-3 for SCS $2 f_0$ and $4 f_0$. The reference PRB 1704 for SCS $2 f_0$ is right aligned with the reference PRB 1706 for the default numerology. The reference PRB 1702 for SCS $4 f_0$ is left aligned with the reference PRB 1704 for SCS $2 f_0$. The reference PRB 1708 for SCS $0.5 f_0$ is left aligned with the reference PRB 1706 for the default numerology.

In the preceding examples, a frequency range of the reference PRB of any numerology is a superset of a frequency range of the reference PRB of each numerology having a smaller subcarrier spacing (SCS).

FIG. 18 is a diagram of a graph 1800 illustrating an example of reference PRB for mixed numerologies.

FIG. 19 is a diagram of a graph 1900 of an example frequency location indexing in the case of mixed numerologies which are multiplexed in frequency domain (FDMed mixed numerologies).

FIG. 20 is a flowchart of an embodiment of a method 2100 for determining a frequency location indexing in wideband CC. The method 2000 begins at block 2002 where the UE obtains a UE independent frequency reference point. The UE may obtain the UE independent frequency reference point using, for example, any of the methods discussed and described above. At block 2004, the UE determines a UE independent frequency location index of a frequency location for a UE specific PRB, reference signal, or other UE specific signal according to the UE independent frequency reference point.

It should be appreciated that one or more steps of the embodiment methods provided herein may be performed by corresponding units or modules, according to FIG. 21. For example, a signal may be transmitted by a transmitting unit or a transmitting module. A signal may be received by a receiving unit or a receiving module. A signal may be processed by a processing unit or a processing module. Other steps may be performed by UE independent frequency reference point obtaining module and a UE frequency location index determining module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Additional details regarding the EDs 110 and the base stations 170 are known to those of skill in the art. As such, these details are omitted here for clarity.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method, comprising:
    receiving, by an apparatus, remaining system information (RMSI) indicating a relative frequency distance;
    obtaining, by the apparatus, a frequency reference point based on a starting subcarrier of a reference synchronization signal block (SSB) and the relative frequency distance; and
    determining, by the apparatus, a first reference resource block (RB) associated with a first subcarrier spacing based on the frequency reference point, wherein an index of the first reference RB is 0, and wherein a starting subcarrier of the first reference RB includes the frequency reference point.

2. The method of claim 1, wherein the reference SSB has a different subcarrier spacing from the first reference RB.

3. The method of claim 1, further comprising:
    determining, by the apparatus, a second reference RB associated with a second subcarrier spacing based on the frequency reference point, wherein an index of the second reference RB is 0, wherein a starting subcarrier of the second reference RB includes the frequency reference point, and wherein the first reference RB has a different subcarrier spacing from the second reference RB.

4. The method of claim 1, further comprising:
before the obtaining the frequency reference point:
obtaining, by the apparatus, a second frequency reference point, wherein the second frequency reference point is used to determine a reference signal for decoding the RMSI or a control resource set (CORESET) of the RMSI.

5. The method of claim 1, wherein the frequency reference point is an apparatus independent frequency reference point.

6. The method of claim 1, further comprising:
receiving, by the apparatus, physical broadcast channel (PBCH) information of an SS block indicating whether the SS block is the reference SSB.

7. The method of claim 1, wherein the frequency reference point is used to determine a reference signal for unicast data over a new radio (NR)-physical downlink shared channel (PDSCH).

8. A method, comprising:
transmitting, by a base station to a user equipment (UE), remaining system information (RMSI) indicating a relative frequency distance,
wherein the relative frequency distance and a starting subcarrier of a reference synchronization signal block (SSB) are used to obtain a frequency reference point,
wherein the frequency reference point is used to determine a first reference resource block (RB) associated with a first subcarrier spacing,
wherein an index of the first reference RB is 0, and
wherein a starting subcarrier of the first reference RB includes the frequency reference point.

9. The method of claim 8, wherein the reference SSB has a different subcarrier spacing from the first reference RB.

10. The method of claim 8,
wherein the frequency reference point is used to determine a second reference RB associated with a second subcarrier spacing,
wherein an index of the second reference RB is 0,
wherein a starting subcarrier of the second reference RB includes the frequency reference point, and
wherein the first reference RB has a different subcarrier spacing from the second reference RB.

11. The method of claim 8,
wherein a second frequency reference point is obtained before the frequency reference point is obtained, and
wherein the second frequency reference point is used to determine a reference signal for decoding the RMSI or a control resource set (CORESET) of the RMSI.

12. The method of claim 8, wherein the frequency reference point is a UE independent frequency reference point.

13. The method of claim 8, further comprising:
transmitting, by the base station to the UE, physical broadcast channel (PBCH) information of an SS block indicating whether the SS block is the reference SSB.

14. The method of claim 8, wherein the frequency reference point is used to determine a reference signal for unicast data over a new radio (NR)-physical downlink shared channel (PDSCH).

15. An apparatus, comprising:
at least one processor; and
a non-transitory computer readable storage medium storing programming for execution by the at least one processor, the programming including instructions to:
receive remaining system information (RMSI) indicating a relative frequency distance;
obtain a frequency reference point based on a starting subcarrier of a reference synchronization signal block (SSB) and the relative frequency distance; and
determine a first reference resource block (RB) associated with a first subcarrier spacing based on the frequency reference point, wherein an index of the first reference RB is 0, and wherein a starting subcarrier of the first reference RB includes the frequency reference point.

16. The apparatus of claim 15, wherein the reference SSB has a different subcarrier spacing from the first reference RB.

17. The apparatus of claim 15, the programming further including instructions to:
determine a second reference RB associated with a second subcarrier spacing based on the frequency reference point, wherein an index of the second reference RB is 0, wherein a starting subcarrier of the second reference RB includes the frequency reference point, and wherein the first reference RB has a different subcarrier spacing from the second reference RB.

18. The apparatus of claim 15, the programming further including instructions to:
before obtaining the frequency reference point:
obtain a second frequency reference point, wherein the second frequency reference point is used to determine a reference signal for decoding the RMSI or a control resource set (CORESET) of the RMSI.

19. The apparatus of claim 15, wherein the frequency reference point is an apparatus independent frequency reference point.

20. The apparatus of claim 15, the programming further including instructions to:
receive physical broadcast channel (PBCH) information of an SS block indicating whether the SS block is the reference SSB.

21. The apparatus of claim 15, wherein the frequency reference point is used to determine a reference signal for unicast data over a new radio (NR)-physical downlink shared channel (PDSCH).

22. A base station, comprising:
at least one processor; and
a non-transitory computer readable storage medium storing programming for execution by the at least one processor, the programming including instructions to:
transmit, to a user equipment (UE), remaining system information (RMSI) indicating a relative frequency distance,
wherein the relative frequency distance and a starting subcarrier of a reference synchronization signal block (SSB) are used to obtain a frequency reference point,
wherein the frequency reference point is used to determine a first reference resource block (RB) associated with a first subcarrier spacing,
wherein an index of the first reference RB is 0, and
wherein a starting subcarrier of the first reference RB includes the frequency reference point.

23. The base station of claim 22, wherein the reference SSB has a different subcarrier spacing from the first reference RB.

24. The base station of claim 22,
wherein the frequency reference point is used to determine a second reference RB associated with a second subcarrier spacing, wherein an index of the second reference RB is 0,
wherein a starting subcarrier of the second reference RB includes the frequency reference point, and
wherein the first reference RB has a different subcarrier spacing from the second reference RB.

25. The base station of claim 22,
wherein a second frequency reference point is obtained before the frequency reference point is obtained, and
wherein the second frequency reference point is used to determine a reference signal for decoding the RMSI or a control resource set (CORESET) of the RMSI.

26. The base station of claim 22, wherein the frequency reference point is a UE independent frequency reference point.

27. The base station of claim 22, the programming further including instructions to:
transmit physical broadcast channel (PBCH) information of an SS block indicating whether the SS block is the reference SSB.

28. The base station of claim 22, wherein the frequency reference point is used to determine a reference signal for unicast data over a new radio (NR)-physical downlink shared channel (PDSCH).

29. A method, comprising:
receiving, by an apparatus, remaining system information (RMSI) indicating a relative frequency distance;
obtaining, by the apparatus, a common frequency reference point based on a starting subcarrier of a reference synchronization signal block (SSB) and the relative frequency distance; and
determining, by the apparatus, a physical resource block (PRB) index of a PRB according to the common frequency reference point,
wherein the common frequency reference point is identified by the SSB associated with the common frequency reference point, and
wherein a first frequency reference PRB is left-aligned with a second frequency reference PRB at the common frequency reference point; and
receiving, by the apparatus, an offset from a lowest frequency of the reference SSB to obtain a specific PRB associated with the reference SSB.

30. The method of claim 29, wherein a reference signal is generated based on the common frequency reference point, and wherein the common frequency reference point is a single frequency reference point for PRB indexing for reference signal generation by the apparatus and another apparatus.

31. The method of claim 29, wherein the first frequency reference PRB is associated with a first numerology, and the second frequency reference PRB is associated with a second numerology.

32. An apparatus, comprising:
at least one processor; and
a non-transitory computer readable storage medium storing programming for execution by the at least one processor, the programming including instructions to:
receive remaining system information (RMSI) indicating a relative frequency distance;
obtain a common frequency reference point based on a starting subcarrier of a reference synchronization signal block (SSB) and the relative frequency distance; and
determine a physical resource block (PRB) index of a PRB according to the common frequency reference point,
wherein the common frequency reference point is identified by the SSB associated with the common frequency reference point, and
wherein a first frequency reference PRB is left-aligned with a second frequency reference PRB at the common frequency reference point; and
receive an offset from a lowest frequency of the reference SSB to obtain a specific PRB associated with the reference SSB.

33. The apparatus of claim 32, Wherein a reference signal is generated based on the common frequency reference point, and wherein the common frequency reference point is a single frequency reference point for PRB indexing for reference signal generation by the apparatus and another apparatus.

34. The apparatus of claim 32, wherein the first frequency reference PRB is associated with a first numerology, and the second frequency reference PRB is associated with a second numerology.

* * * * *